(No Model.)

R. K. BURT.
HARNESS STRAP.

No. 379,196. Patented Mar. 6, 1888.

WITNESSES:
R. L. Clemmitt.
John E. Morris.

INVENTOR:
Ransom K. Burt

BY Chas. B. Mann,
ATTORNEY.

N. PETERS, Photo-Lithographer, Washington, D. C.

UNITED STATES PATENT OFFICE.

RANSOM K. BURT, OF HADDAM, KANSAS, ASSIGNOR OF ONE-HALF TO HENRY M. OCHILTREE, OF SAME PLACE.

HARNESS-STRAP.

SPECIFICATION forming part of Letters Patent No. 379,196, dated March 6, 1888.

Application filed December 19, 1887. Serial No. 258,415. (No model.)

*To all whom it may concern:*

Be it known that I, RANSOM K. BURT, a citizen of the United States, residing at Haddam, in the county of Washington and State of Kansas, have invented certain new and useful Improvements in Harness-Straps, of which the following is a specification.

My invention relates to an improved strap for the various parts of harness, riding-saddles, halters, and such uses.

The invention is illustrated in the accompanying drawings, in which—

Figure 1:
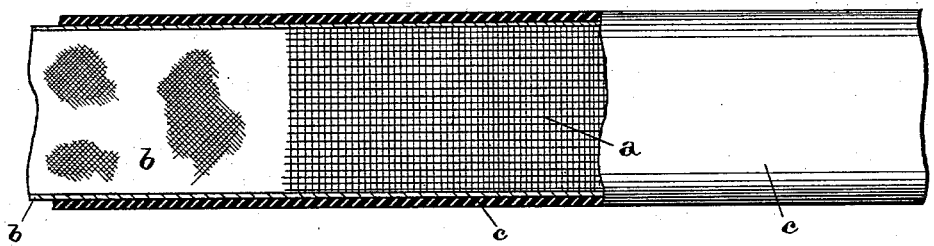
Figure 2:
Figure 4:
Figure 3:
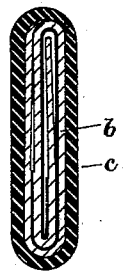
Figure 5:
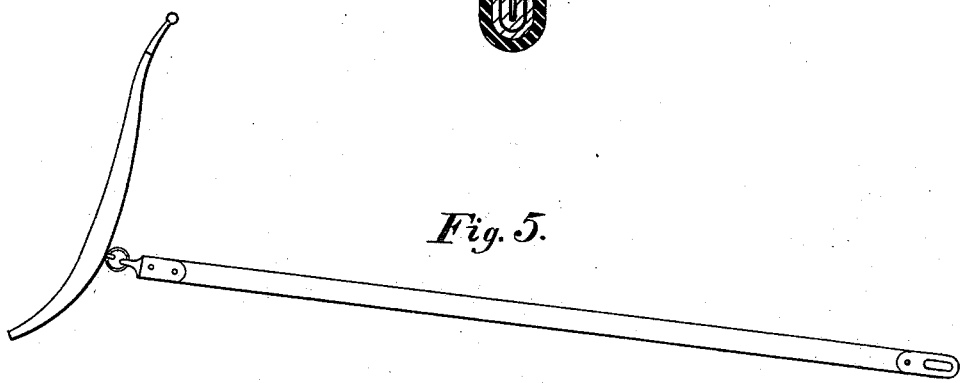

Figure 1 is a side view of my improved strap broken away to show three surfaces—the rubber, the woven wire, and the canvas. Fig. 2 is an edge view of the strap broken away, as in Fig. 1, to show the several parts. Fig. 3 is a cross-section of a flat strap. Fig. 4 is a cross-section of a round strap. Fig. 5 is a view of a harness-trace made of the improved strap.

The strap is composed of woven wire, suitable canvas or fabric, and rubber arranged in alternate layers, or the woven wire and canvas folded together and the rubber inclosing them both and partly vulcanized.

Referring to the drawings, the construction or composition of the strap will be seen. The letter *a* designates woven wire made of any suitable metal, *b* canvas or fabric of any kind wrapped or folded about the woven wire, and *c* a sheath of vulcanized rubber inclosing said parts.

In manufacturing the strap the three parts may be folded or rolled together, so as to have the rubber on the exterior, or only the wire and canvas folded together, and then covered by a coat or sheath of rubber and vulcanized sufficiently to give the desired toughness.

The wire and canvas make the strap strong, and yet leave it sufficiently flexible, and the rubber coat protects the said inclosed parts from the action of air and moisture.

It will be seen that flat and round straps may be made with equal facility.

Straps of this character may be spliced or united by a coupling such as or similar to that for which United States Letters Patent were granted me December 9, 1884, No. 308,875.

Ordinary tongue-buckles may be used with this strap, or a cam-buckle which will not require holes to be punched in the strap.

Having described my invention, I claim and desire to secure by Letters Patent of the United States—

1. The harness-strap herein described, consisting of woven wire and canvas rolled or folded together, said parts being inclosed by a sheathing of rubber, as shown and described.

2. The harness-strap herein described, consisting of strips *a* of woven wire and canvas strips *b*, said strips being rolled or folded together, and an exterior sheathing, *c*, of vulcanized rubber inclosing said folded or rolled strips *a* and *b*, substantially as described.

In testimony whereof I affix my signature in presence of two witnesses.

RANSOM K. BURT.

Witnesses:
P. S. LESKER,
B. L. WILSON.